United States Patent [19]

Hertel et al.

[11] Patent Number: 5,486,096
[45] Date of Patent: Jan. 23, 1996

[54] EROSION RESISTANT SURFACE PROTECTION

[75] Inventors: Christopher J. Hertel, Glastonbury; Charles R. Watson, Windsor, both of Conn.

[73] Assignee: United Technologies Corporation, Hartford, Conn.

[21] Appl. No.: 268,592

[22] Filed: Jun. 30, 1994

[51] Int. Cl.$^6$ ............ F01D 5/28; B64C 27/473; B05D 3/02; B32B 27/38

[52] U.S. Cl. ............ 416/224; 416/229 A; 416/230; 416/241 A; 156/313; 156/330; 427/386; 427/393.5; 428/290; 428/473.5

[58] Field of Search ............ 416/224, 229 A, 416/230, 241 A; 415/200; 427/370, 386, 393.5; 156/307.1, 313, 330; 428/246, 251, 289, 290, 413, 415, 414, 417, 902, 473.5, 283

[56] References Cited

U.S. PATENT DOCUMENTS

| | | |
|---|---|---|
| 1,367,132 | 2/1921 | Frederick . |
| 1,860,557 | 5/1932 | Sukohl . |
| 2,477,375 | 7/1949 | Jablonsky . |
| 3,572,971 | 3/1971 | Seiwert . |
| 3,600,103 | 8/1971 | Gray et al. . |
| 3,701,190 | 10/1972 | Stone, Jr. . |
| 3,758,234 | 9/1973 | Goodwin . |
| 3,762,835 | 10/1973 | Carlson et al. . |
| 4,000,956 | 1/1977 | Carlson et al. . |
| 4,006,999 | 2/1977 | Brantley et al. . |
| 4,314,892 | 2/1982 | Stevens . |
| 4,594,761 | 6/1986 | Murphy et al. . |
| 4,636,535 | 1/1987 | Wang et al. . |
| 4,645,803 | 2/1987 | Kohli et al. . |
| 4,842,663 | 6/1989 | Kramer . |
| 4,892,462 | 1/1990 | Barbier et al. . |
| 4,895,491 | 1/1990 | Cross et al. . |
| 4,902,368 | 2/1990 | Oldham ............ 156/306.9 |
| 4,935,277 | 6/1990 | Le Balc'h . |
| 4,944,655 | 7/1990 | Merz . |
| 4,954,382 | 9/1990 | Riefler et al. ............ 428/116 |
| 4,966,527 | 10/1990 | Merz . |
| 5,141,400 | 8/1992 | Murphy et al. ............ 416/229 A |
| 5,160,248 | 11/1992 | Clarke ............ 415/9 |
| 5,210,944 | 5/1993 | Monson et al. . |
| 5,344,280 | 9/1994 | Langenbrunner et al. ............ 415/9 |

Primary Examiner—Edward K. Look
Assistant Examiner—James A. Larson

[57] ABSTRACT

A coating for protection of airfoil surfaces from erosion caused by the impingement of particles in the incoming air stream of a gas turbine engine or on helicopter blades. The coating consists of an epoxy film toughened with hard particles to improve the erosion resistance and softer particles which impede the progression of cracks through the coating. A method for applying the coating is also described.

11 Claims, 1 Drawing Sheet

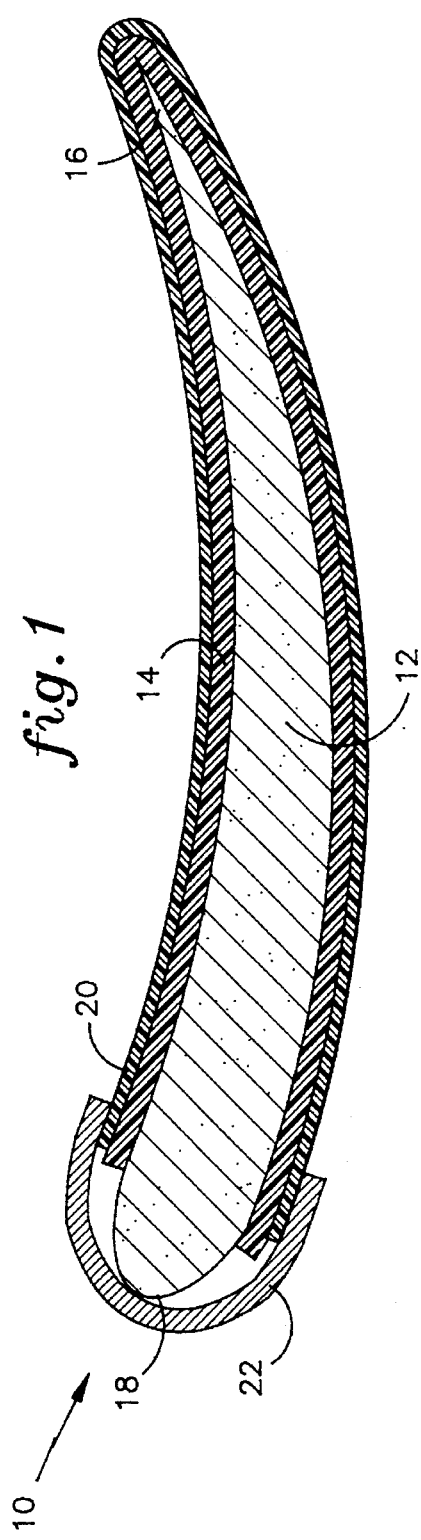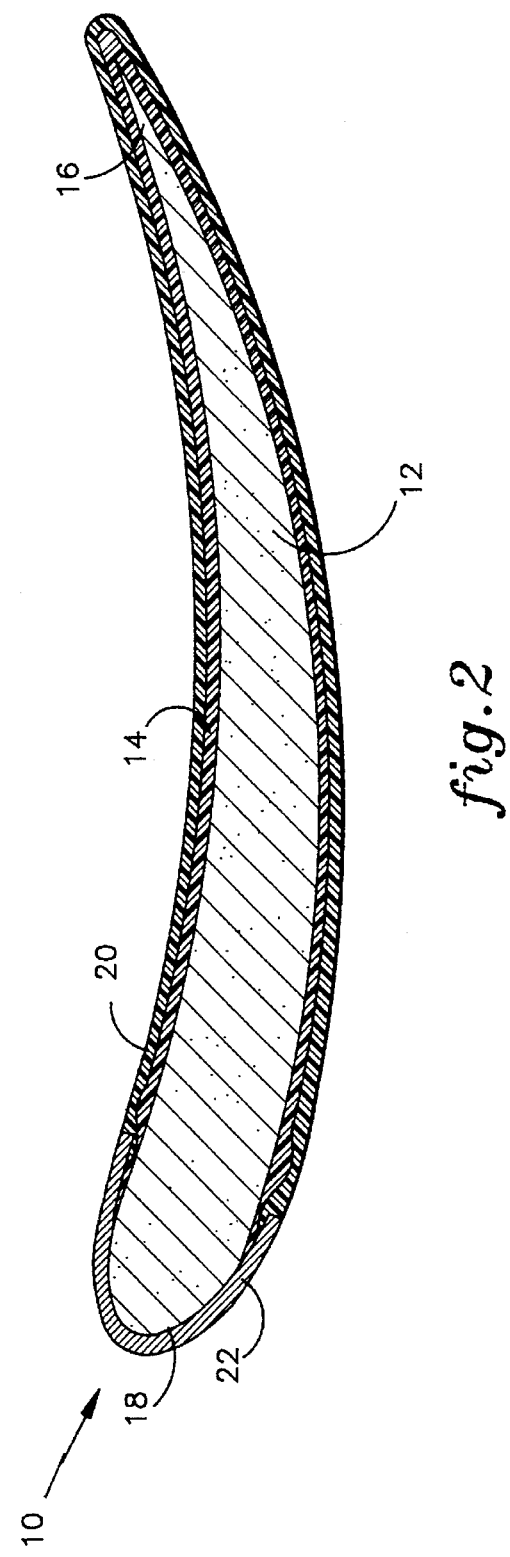

EROSION RESISTANT SURFACE PROTECTION

TECHNICAL FIELD

This invention relates generally to erosion resistant coatings on composite structures. The invention also relates to the application of an erosion resistant material to the surface of an airfoil, and more particularly a gas turbine engine airfoil. The invention also relates to a fiber reinforced epoxy matrix composite airfoil having good erosion resistance.

BACKGROUND ART

The operation of gas turbine engines involves the passage of high volumes of air through the compressor portion of the engine. The high volumes of air inevitably candy a certain amount of hard particles, including abrasive materials such as sand, dirt, metal scraps, etc., which cause serious problems of erosion to the engine components.

The need to provide greater power and greater thrust-to-weight ratios in the advanced engines has led to the development of lightweight non-metallic components in certain portions of the engines. Fiber reinforced epoxy matrix composites are a typical example of materials which have found extensive application in the aerospace industry, particularly for use as airfoil materials in the fan bypass and early compressor stages, where these composites can withstand the temperatures incurred.

Experience with these non-metallic composites has shown that they are prone to surface erosion due to the abrasive particles impinging on the surfaces of the components. This erosion seriously decreases the useful lifetime of the components.

It has been customary to apply an erosion resistant coating to the surface of the components to prolong their lifetimes. A typical coating is achieved by spraying a layer of polyurethane onto the surface of the component, followed by curing at elevated temperature to bond the coat and develop the optimum erosion resistant properties. Typically several coats, up to as many as 20, have been applied to achieve a sufficient coating thickness for adequate erosion resistance. Total coating thickness is usually on the order of 0,005–0.020". Careful surface preparation of the part is required to promote coating adhesion.

The sprayed polyurethane coating has been found to be insufficient to provide adequate protection on the leading edges of the airfoils, where the erosive effects are the greatest. In these areas it is customary to install a metal sheath, either solid or mesh, to provide the necessary protection. However it is not desirable to coat the entire surface of the airfoils with metal because of the added weight and the difficulties of fabrication of the airfoils with an all encompassing metal sheath.

Murphy, et. al., in U.S. Pat. No. 4,594,761, disclose the use of a polyurethane sheath to provide erosion resistance on hollow airfoils used in gas turbine engines. In this method, a polyurethane film, which has an adhesive resin on one surface, is attached to the surface of the airfoil.

Merz, in U.S. Pat. No. 4,966,527, teaches the construction of a composite blade which includes a jacket, a part of which is an erosion protective outer coating made of a polyurethane lacquer or a polyurethane elastomer film.

Barbier, et. al., in U.S. Pat. No. 4,990,205, teach construction of a composite blade which includes an outer layer of "molded polyurethane, which enables the outer profile of the blade to be produced with precision and which possesses excellent resistance to erosion by sand."

While the polyurethane coatings provide good erosion resistance on the surfaces of non-metallic composite airfoils, the performance of these components does not completely fulfill the desired lifetime requirements. The polyurethane provides good resistance to erosion, and is a significant improvement over the epoxy matrix material of the composite. However, the polyurethane coating, which is bonded to the surface of the pre-cured epoxy matrix composite substrate, suffers from premature disbonding if the coating is penetrated by unusually large or sharp particles impinging on the surface or the surface of the composite has not been prepared carefully enough.

An alternate form of erosion-resistant coating consists of an epoxy impregnated fiberglass cloth which is applied to the surface of the fiber reinforced epoxy matrix composite article. By using similar epoxy resins for the article and the coating, and curing both in the same operation, an erosion-resistant coating which is integrally bonded to the structure is obtained. This coating overcomes the peeling problems associated with the bonded polyurethane coatings, and is much faster and less costly to apply. Even though its erosion resistance is not as good as the polyurethane materials, the reduced cost and high resistance to peeling can make it a more desirable coating.

What is needed is an erosion resistant coating for fiber reinforced epoxy matrix composite articles which has improved resistance to erosion compared to the prior art epoxy base coatings.

What is also needed is an erosion resistant coating for fiber reinforced epoxy matrix composite articles which has better resistance to disbonding than the prior art bonded polyurethane coatings.

What is still further needed is a method for applying the improved erosion resistant coatings to the surface of fiber reinforced epoxy matrix composite articles.

DISCLOSURE OF INVENTION

The erosion-resistant fiber reinforced composite article of the present invention comprises a series of fiber reinforced plies laid up in the configuration required for the structure of the article, an epoxy resin-impregnated fiberglass cloth positioned over the surface of the article, and a toughened epoxy film containing a reinforming mat of continuous or discontinuous reinforcing fibers. All the elements of this assembly are co-cured to form a fiber reinforced composite article with an erosion-resistant outer layer covering a damage resistant inner-layer which covers the composite structure.

The erosion resistant coating of the present invention comprises a toughened epoxy film applied to the surface of the article which is co-cured along with the epoxy matrix composite material during fabrication of the composite article. The toughened epoxy film has filler particles, typically 30%–60% by weight, which provide improved resistance to attack of the epoxy material by the impinging particles, and toughening agents, typically 5%–10% by weight, which generally act as crack stoppers in preventing cracks from growing to where they will cause failure of the coating.

The fillers are typically very small particles of very hard materials, such as $SiO_2$ and $Al_2O_3$, although particles of softer materials, such as aluminum, have also been found to provide significant benefits. The toughening agents are generally small particles of resilient materials, such as rubber or ductile thermoplastic, which hinder the growth of cracks by yielding as the cracks approach the particles.

In addition, the toughened film is strengthened with a reinforcing mat comprising either continuous fibers, usually woven or oriented, or short, randomly oriented, discontinuous lengths of fibers. The fibers are most commonly polyester, fiberglass, or nylon, but may also be, for example, carbon, glass, silicon carbide or aluminum borosilicate. The toughened epoxy fibers typically have fracture energies (a qualitative measure of impact resistance) ranging from abut 100 to about 300 ft-lb/ft$^2$, as compared to conventional epoxy films which have fracture energies ranging from about 5 to about 25 ft-lb/ft$^2$.

The toughened epoxy film is applied to the outer surface of the article during the fabrication sequence, with an intermediate layer of epoxy-impregnated fiberglass cloth applied to provide protection from handling damage. Typically, the article is then placed in a mold which defines the final configuration of the article, pressure is applied to densify the composite material and the coating materials and to assure that complete contact is maintained between the article and the coating materials, and the article is heated to a temperature at which the epoxy material in both the article and the coating is cured. During this compaction and heating process, the epoxy materials in the composite, the damage resistant layer and the erosion resistant coating mix to form a chemical bond between the composite material and the coating materials. In this manner, an integral structure is formed, rather than having a coating material which is bonded to a pre-cured composite substrate.

The erosion resistant coatings of the present invention also include resin systems having higher temperature capability than the epoxies, such as, but not limited to, polyimides and bismaleimides. Also included is the incorporation of materials to support the resin, such as carbon, fiberglass or organic fibers which can be in the form of, for example, mat, tape, fabric and scrim.

The present invention also includes the application of toughened resins in liquid, rather than sheet, form, which can be applied by spray or brush coating methods. This provides a convenient method for field repairs of damaged components.

While the invention is described with regard to the fabrication of gas turbine engine hardware, it is also applicable in other highly erosive situations, such as helicopter rotor blades.

These, and other features and advantages of the invention, will be apparent from the description of the Best Mode, read in conjunction with the drawings.

BRIEF DESCRIPTION OF THE DRAWING

FIG. 1 is a cross section through the airfoil of the assembled vane components.

FIG. 2 is a cross section through the airfoil of the vane of FIG. 1 after completion.

BEST MODE FOR CARRYING OUT THE INVENTION

By way of illustration of the method of the invention for applying an erosion resistant coating, the fabrication of a fan exit guide vane for a gas turbine engine will be described. As shown in FIG. 1, the vane 10 was formed by laying up precut epoxy impregnated plies 12 of carbon reinforcing fibers in a manner which will give the desired mechanical properties in the finished vane. A layer of epoxy impregnated fiberglass cloth 14 was then placed over the surface of the airfoil portion of the vane, with the approximate center of the cloth 14 at the trailing edge 16 of the vane and the edges of the cloth 14 near the leading edge 18 of the vane. In a similar manner a layer of toughened epoxy film 20 reinforced with a mat of randomly oriented fibers was placed over the fiberglass both 14. FM® 300 Interleaf, a product of the American Cyanamid Company, Wayne, N.J., was used as the toughened epoxy film for this experiment. A stainless steel mesh cap 22, shaped to conform to the shape of the leading edge 18, was then placed over the vane.

The assembled components were then placed in a mold shaped to the desired configuration of the timshed article, the mold was gradually heated in a hydraulic press to 350° F. (177° C.) in 30 minutes, a pressure of about 1000 psi was applied when the temperature reached about 280° F. (138° C.), and the assembly was held for one hour at temperature. A cross section through the airfoil portion of the completed vane is shown in FIG. 2.

A similar vane was also constructed in the same manner, except that no toughened epoxy coating was applied for improved erosion resistance.

After cooling and removal from the mold, the vanes were subjected to erosion testing. Eighty grit silicon carbide particulate was directed at the surfaces of the coated vanes at a rate of 725 grams per minute by a high pressure air nozzle. The nozzle was positioned 12 inches from the leading edge of the vanes, and the stream of particles directed toward the concave surfaces of the vanes by a 140 feet per second air stream at an angle of about 15 degrees.

Under these test conditions, the prior art fiberglass/epoxy coating showed an erosion rate of 3.2 mils per minute, while the toughened epoxy coating showed an erosion rate of 1.6 mils per minute, a decrease of 50%.

While a layer of fiberglass both between the plies of carbon reinforcing fibers and the toughened epoxy erosion resistant layer, for the purpose of providing additional resistance to handling damage during the fabrication operations, has been shown in this example, one of average skill in the art will understand that the principles of the invention are applicable whether or not this intermediate layer is present.

Although this invention has been shown and described with respect to detailed embodiments thereof, it will be understood by those skilled in the art that various changes, omissions and additions in form and detail thereof may be made without departing from the spirit and scope of the claimed invention.

We claim:

1. An erosion resistant surface coating for an epoxy matrix composite airfoil comprising a toughened epoxy film co-cured on the surface of the composite airfoil.

2. A method for improving the erosion resistance of an epoxy matrix composite article comprising:
   a. Fabricating a fiber reinforced epoxy matrix airfoil;
   b. overlaying the fiber reinforced epoxy matrix airfoil with a toughened epoxy film; and
   c. compressing and heating the article to simultaneously cure epoxy resin in the composite article, and the toughened epoxy film.

3. A method for improving the erosion resistance of an epoxy matrix composite article comprising:
   a. fabricating a fiber reinforced epoxy matrix article;

b. positioning a layer of epoxy resin-impregnated fiberglass cloth over the fiber reinforced epoxy matrix article;

c. overlaying the fiberglass cloth with a toughened epoxy film; and compressing and heating the article to simultaneously cure epoxy resin in the composite article, the fiberglass cloth and the toughened epoxy film.

4. An erosion resistant epoxy matrix reinforced composite article comprising a fiber reinforced epoxy matrix airfoil overlaid with a toughened epoxy film.

5. An erosion resistant epoxy matrix reinforced composite article comprising a fiber reinforced epoxy matrix article overlaid with a toughened epoxy film wherein a layer of epoxy resin-impregnated fiberglass cloth is interposed between the article and the toughened epoxy film.

6. A gas turbine engine article comprising a reinforced epoxy matrix airfoil overlaid with a toughened epoxy film.

7. A gas turbine engine article comprising a reinforced epoxy matrix airfoil overlaid with a toughened epoxy film wherein a layer of epoxy resin-impregnated fiberglass cloth is interposed between the airfoil and the toughened epoxy film.

8. An article comprising a reinforced epoxy matrix helicopter rotor blade overlaid with a toughened epoxy film.

9. A helicopter rotor blade comprising a reinforced epoxy matrix blade overlaid with a toughened epoxy film wherein a layer of epoxy resin-impregnated fiberglass cloth is interposed between the blade and the toughened epoxy film.

10. An erosion resistant surface coating for a resin matrix composite airfoil comprising a toughened resin film co-cured on the surface of the composite airfoil, with the matrix resin being the same as the film resin.

11. The coating as recited in claim 10 wherein the resin comprises polyimides or bismaleimides.

* * * * *